United States Patent [19]

Spooner

[11] Patent Number: 4,646,780

[45] Date of Patent: Mar. 3, 1987

[54] TOILET TANK FLOAT VALVE ASSEMBLY

[75] Inventor: Tobin H. Spooner, Sheboygan Falls, Wis.

[73] Assignee: Kohler Co., Kohler, Wis.

[21] Appl. No.: 891,864

[22] Filed: Jul. 30, 1986

[51] Int. Cl.4 ............... F16K 31/26; F16K 33/00
[52] U.S. Cl. .................. 137/426; 137/444; 137/445
[58] Field of Search ............ 137/426, 434, 444, 445

[56] References Cited

U.S. PATENT DOCUMENTS

| | | | |
|---|---|---|---|
| 659,391 | 10/1900 | Fischer | 137/426 |
| 1,027,980 | 5/1912 | Bliler et al. | 137/444 |
| 1,609,337 | 12/1926 | Waltrous | 137/426 |
| 2,833,302 | 5/1958 | Smith | 137/426 |
| 3,025,872 | 3/1962 | McLerran et al. | 137/426 |
| 3,987,813 | 10/1976 | Leczycki | 137/426 |
| 4,335,741 | 6/1982 | Nasser | 137/444 |

FOREIGN PATENT DOCUMENTS 60-43503 9/1985 Japan .

310190 4/1929 United Kingdom ............ 137/426

OTHER PUBLICATIONS

Three pages of photographs of a "KVK" Valve, undated, admitted prior art.
Two pages of photographs of an "INA" Valve, undated, admitted prior art.
Pages 190 and 191 of vol. 3 of "How Things Work", undated, admitted prior art.

Primary Examiner—George L. Walton
Attorney, Agent, or Firm—Quarles & Brady

[57] ABSTRACT

There is disclosed a float valve assembly of the type especially well suited to control the flow of inlet water to a toilet tank having a lavatory defined by its cover. The invention relates in particular to a means of making the fitting suitable for use in toilets having different optimal fill levels, and in particular to a means of adjusting the fill level which involves rotation of the rod attached to the float ball on its longitudinal axis. A lead screw-type mechanism causes a connecting linkage to move along the rod into response to such rotation.

6 Claims, 8 Drawing Figures

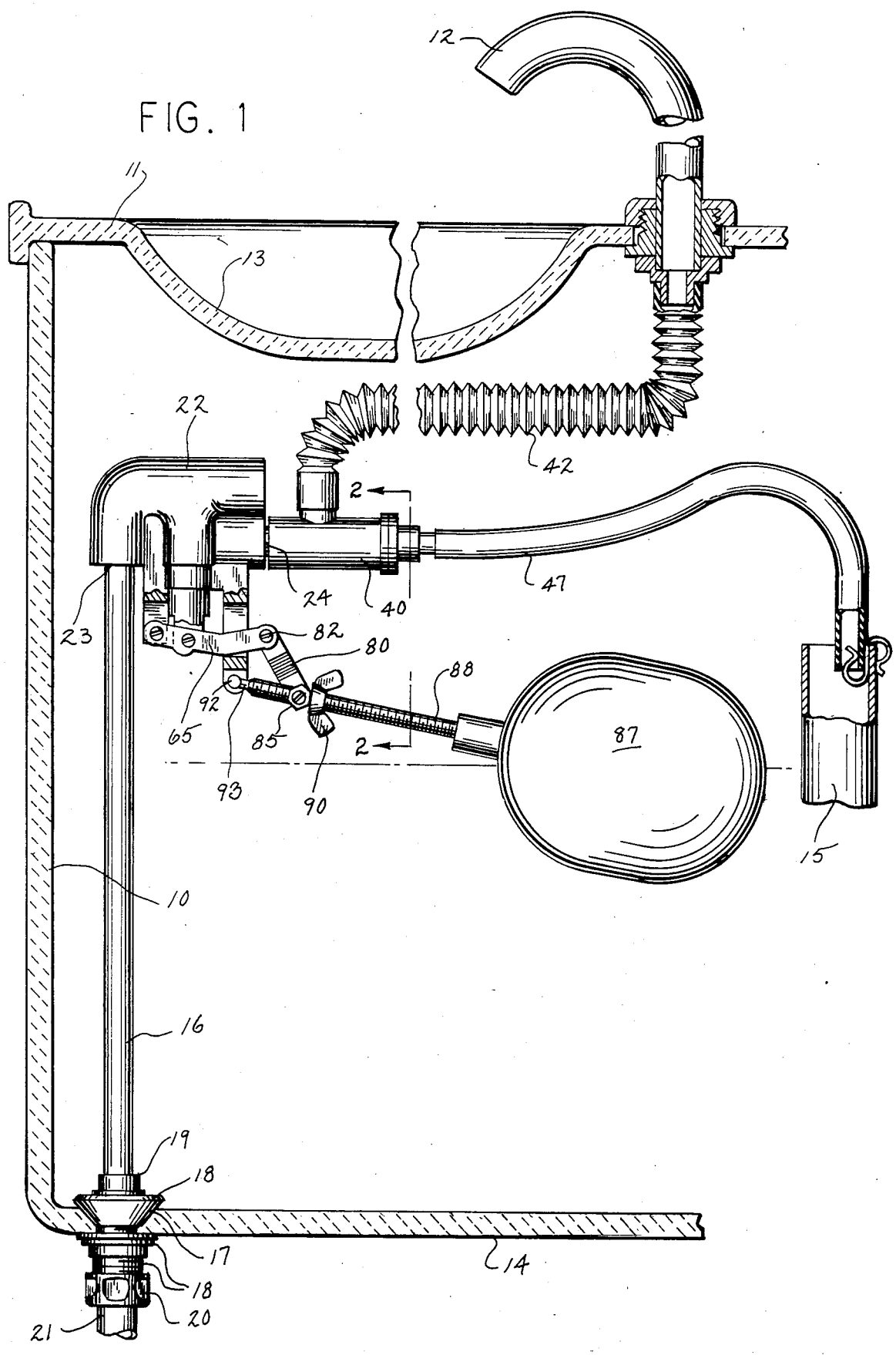

TOILET TANK FLOAT VALVE ASSEMBLY

BACKGROUND OF THE INVENTION

A. Field of the Invention

The present invention relates to toilet tank float valves of the type used to control the flow of inlet water to a toilet tank. The invention is especially well suited to be used with toilet tanks in which the cover of the tank defines a sink and a spout dispenses water into the sink.

B. Description of the Art

The need for water conservation has increased in recent years. This has led to many inventions for reducing the amount of water required to flush a toilet. A different approach has been to provide a diverter valve in the toilet tank to direct at least a portion of the inlet water to a lavatory spout on top of the tank during the flush cycle. After using the toilet, the user can wash his or her hands under the spout, and then that water drains back into the tank for use in cleaning the toilet bowl during the next flushing cycle.

In one prior art device of this kind there is a diverter valve in the tank with a single inlet and three outlets. One of the outlets feeds water to the spout, a second feeds water to an overflow outlet tube, and a third feeds water directly into the toilet tank. A lever linkage is provided to transmit energy from a float (which follows the water level) to a piston valve which shuts off the water flow to the three outlets when the water has refilled the tank.

Because such valves can be installed in many different size toilets, it is desirable to provide a means for adjusting the float position (and thus the level of water) in the tank which will cause the inlet valve to shut off the water supply to the toilet tank. These adjustments have in the past been made through complex linkages positioned directly under the piston valve. Not only was this adjustment mechanism difficult to reach, it suffered from the use of multiple parts (some of which were expensive to machine), and further did not provide a complete range of adjustment.

In another prior art valve the float rod arm was made so that it could be bent. While this bending adjusted the closing position, it also caused a shortening of the effective lever distance of the rod, thus changing the closing force on the piston valve. In order to achieve an adjustment one would have to change (and in some cases adversely affect) closing pressure.

In another valve, a slot was provided in the rod such that a connecting link could be adjustably positioned along the rod at several positions in the slot. This required several extra components, and required a plumber or other person desiring to make the adjustment to make both a rotational change and a sliding change at a position largely hidden from view by the valve.

It can therefore be seen that a need has existed for an improved means of providing adjustment of the fill level in a toilet tank.

SUMMARY OF THE INVENTION

This invention relates to a toilet tank float valve assembly. As is conventional, there is a valve housing with an inlet and an outlet and a valve bore between the inlet and the outlet; a piston valve member positioned so as to reciprocate in the valve bore to control the fluid flow from the inlet to the outlet through the housing; a lever arm; and a connecting link. The lever arm is linked to the valve housing so as to pivot with respect thereto on a first axis, and the pivoting of the lever arm causes the piston valve member to reciprocate in the valve bore. The lever arm is also linked to the connecting link.

A float is provided which has a rod-like member extending therefrom. There are also means connecting the rod-like member to a support for pivotal movement with respect to the valve housing, and means for attaching the connecting link to the rod-like member such that the connecting link may be adjustably connected to the rod-like member at a plurality of locations along the rod.

The improvement of the present invention relates to the rod-like member and the connecting link being fashioned and connected such that rotation of the rod-like member causes the connecting link to automatically move from one connection position along the rod-like member to another. In this manner, the level of water required in the toilet tank to close the piston valve member can be adjusted by rotating the rod-like member.

In a preferred form the rod-like member has threads on its periphery, the connecting link has a threaded through bore, and the rod-like member extends into the threaded through bore so that its threads mesh with those of the through bore. Rotation of the rod-like member threads drives the through bore threads along the rod-like member.

A connection between the rod-like member and the valve housing can be in the form of a universal ball joint. This permits rotation of the rod on its own axis, as well as pivoting of the rod.

In another aspect of the invention there is provided a valve housing for controlling the admission of water from a water supply conduit to the toilet tank. The valve housing has an inlet and an outlet and movable means for providing communication between the inlet and outlet in an open position and sealing off communication between the inlet and outlet in a closed position. There is also a float having a rod-like member extending therefrom, the rod-like member being threaded. This valve also has a nut threadably engaged with the rod-like member; a linkage connected to the nut and to the movable means for moving said movable means between the open and closed positions in response to movement of the float; and a joint for mounting the rod-like member to a support with the rod-like member rotatable about its own axis and pivotable about a rod pivot axis which is different from its own axis. The tank water level can be adjusted by rotating the rod-like member on its own axis.

Using the present invention, one can readily make adjustments to the fill level of water in the tank simply by rotating the float rod along its longitudinal axis. Because the rod often extends well away from the rest of the valve assembly, this can easily be done even when the valve is installed in a small tank. Once this is done, one can lock the rod at the desired position by rotation of a nut on the same axis (so as to tighten the lock nut against the connecting link).

The provision of a ball head at the end of the float rod, and a hemispherical socket and U-shaped slot on a valve housing support section makes assembly especially easy, and eliminates the need for an attachment screw or other means at that point. It should also be noted that a full range of adjustment positions is provided by the present invention because the adjustment can be stopped at any point along the rotation, rather than just at discreet intervals. Further, none of the adjustment parts which must be reached after the valve is installed to make the adjustment are located proximate to the piston valve. Therefore, there is little chance of there being jamming or sticking of the piston due to interference by improperly positioned adjustment parts.

The objects of the invention therefore include:

(a) providing a toilet tank float valve assembly of the above kind which provides for easy adjustment of the fill level of the tank without the need for tools; and (b) providing a toilet tank float valve assembly of the above kind in which the adjustment mechanism has few parts, is easy to manufacture, and is easy to assemble.

These and still other objects and advantages of the present invention will be apparent from the description which follows. The preferred embodiment of the present invention will be described with reference to the accompanying drawings. These embodiments do not represent the full scope of the invention. Rather, the invention may be employed in other embodiments as well. Reference should therefore be made to the claims herein for interpreting the breadth of the invention.

BRIEF DESCRIPTION OF THE DRAWINGS

FIG. 1 is a partial sectional view showing the float valve assembly of the present invention installed in a tank lid lavatory type toilet;

DESCRIPTION OF THE PREFERRED EMBODIMENT

Figure 3:
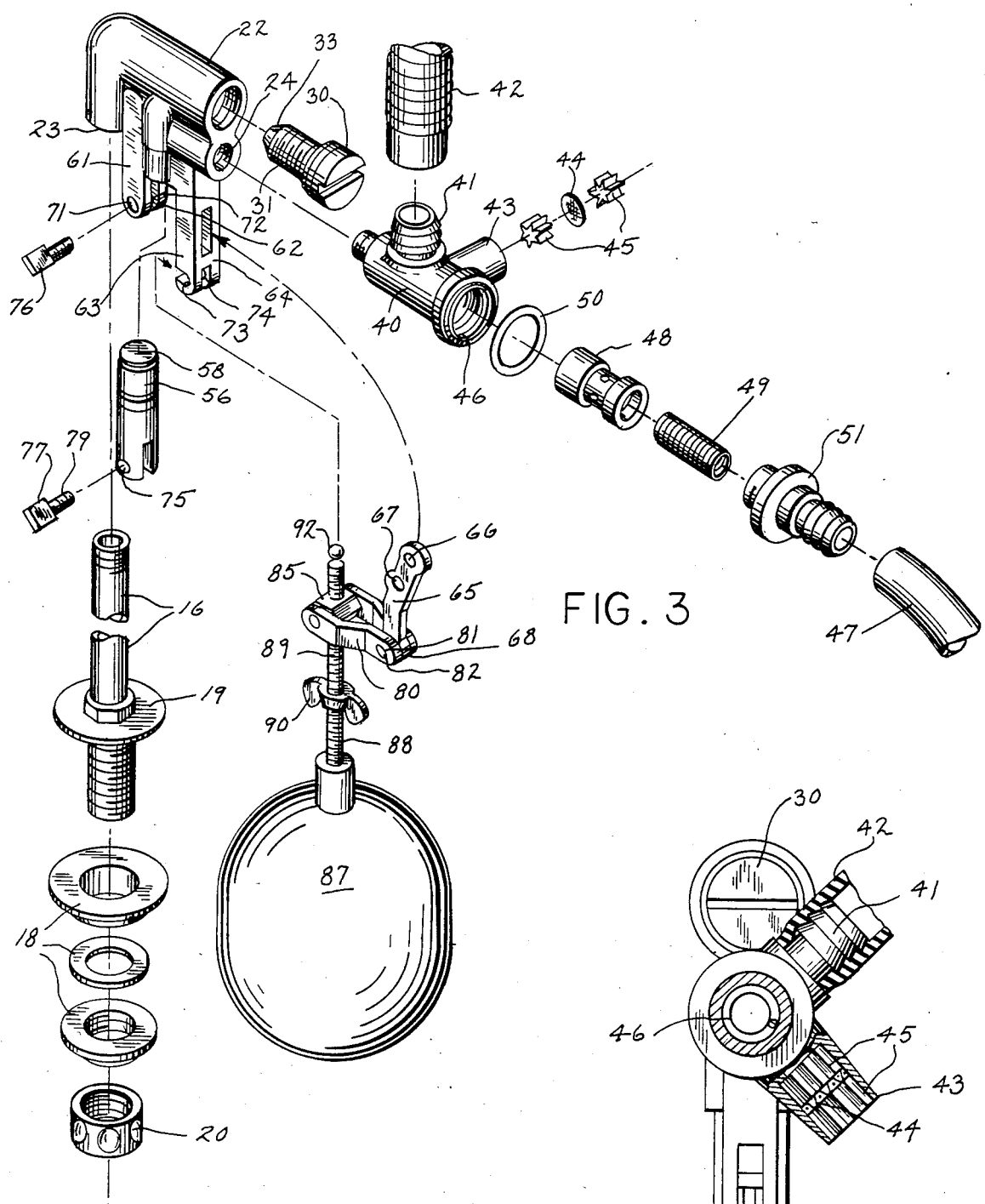
FIG. 3 is an exploded perspective view of the parts of the assembly of FIG. 1.

Referring now to the drawings and in particular FIGS. 1 and 3, a toilet tank 10 has a lid lavatory 11 defined by its cover. Spout 12 dispenses water into a basin 13 for a user to wash his or her hands. Water then drains back from the basin 13 into the tank 10 (to be held in reserve for the next flushing cycle of the toilet).

Near the bottom 14 of the tank 10 is positioned the usual outlet and outlet valve (not shown). The outlet valve is connected to the usual trip lever assembly (not shown). An overflow tube 15 communicates with the tank outlet in the usual fashion so that when the water level in the tank rises to too high a level, the water will flow through overflow tube 15 and past even the closed outlet, to the toilet bowl.

Inlet pipe 16 extends through hole 17 in the bottom 14 of the tank. It is mounted with the usual washers 18, escutcheon 19, nut 20, and the like. Riser pipe 16 is connected to a supply pipe 21. Water travels up the riser pipe 16 into valve housing 22, which has an inlet 23 and an outlet 24.

Figure 2:
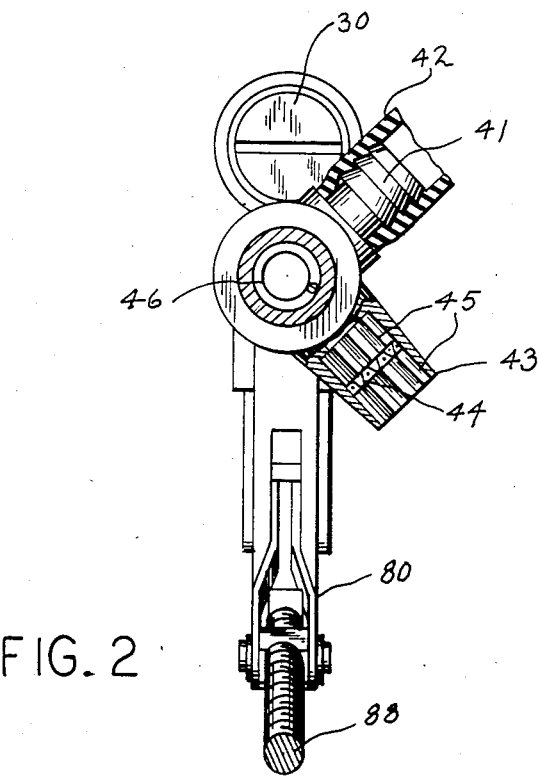
FIG. 2 is a view, partically in section, taken along line 2—2 of FIG. 1, in which the diverter valve has been rotated 45° clockwise from the FIGS. 1 and 4 position.
Figure 4:
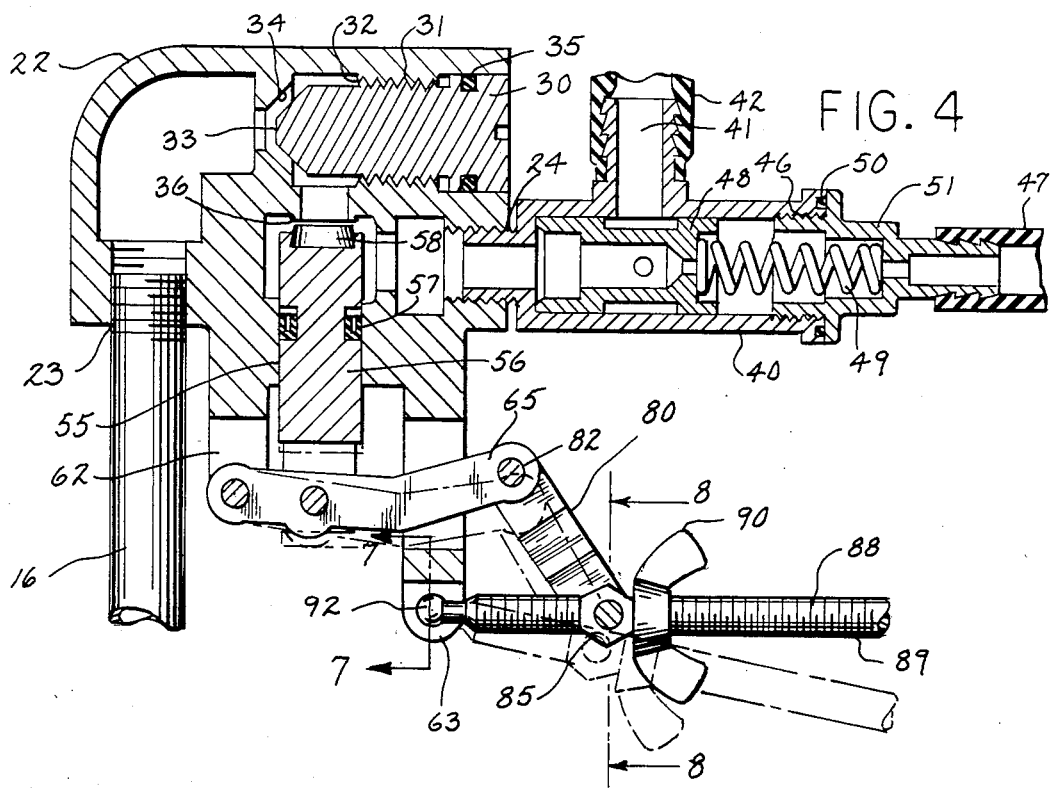
FIG. 4 is a fragmentary view, partially in section, of the assembly of FIG. 1.

Referring to FIGS. 2-4, an adjustment screw 30 is provided in a horizontal bore in the valve housing so as to make adjustments in the flow rate through the valve to compensate for water pressure. The screw 30 has threads 31 which mesh with threads 32 in the valve bore so that rotation of the screw moves the valve head 33 either towards or away from the valve seat 34. The usual seal 35 is also provided to prevent leakage around the screw.

Once water has passed by the screw 30, it passes downward by a second valve seat 36 (see FIG. 4), then horizontally through the housing 22 to the outlet 24. The outlet 24 is connected to the usual three outlet type diverter valve body 40. Threaded nipple 41 on the diverter is connectable to a flexible tube 42, which in turn leads to the spout 12. A second outlet 43 provides tank refill (see especially FIG. 2). A noise reducing screen 44 and two holding webs 45 are jam fit in outlet 43. A third outlet 46 leads to a tube 47, which in turn is clipped onto the overflow tube 15 to provide a flow of water to the rim of the toilet bowl (see FIG. 1).

It will be appreciated that when the valve is in the "on" position, all three outlets of diverter 40 are fed. The usual proportioning plunger 48 is provided, which acts against spring 49 to reduce flow to the lavatory spout and the tank when water pressure is too high. O-ring 50 is provided between the connector cap 51 and the diverter valve body 40 to provide a seal therebetween.

A vertical valve bore 55 (see FIG. 4) is fashioned in the valve housing 22 which has at its top end a valve seat 36. A piston valve 56 with O-ring 57 and top seal 58 reciprocates in the valve bore 55. When the piston is in the "up" position, the seal 58 closes against the valve seat 36 to shut-off all water. When the piston 56 is in any other position, water is permitted to pass through to the diverter 40.

Figure 7:
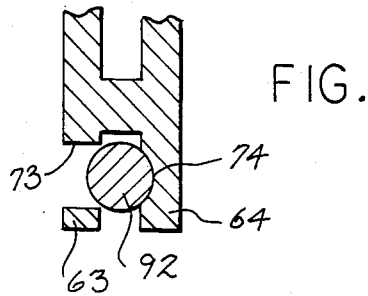
FIG. 7 is a sectional view taken on line 7—7 of FIG. 4.
Figure 5:
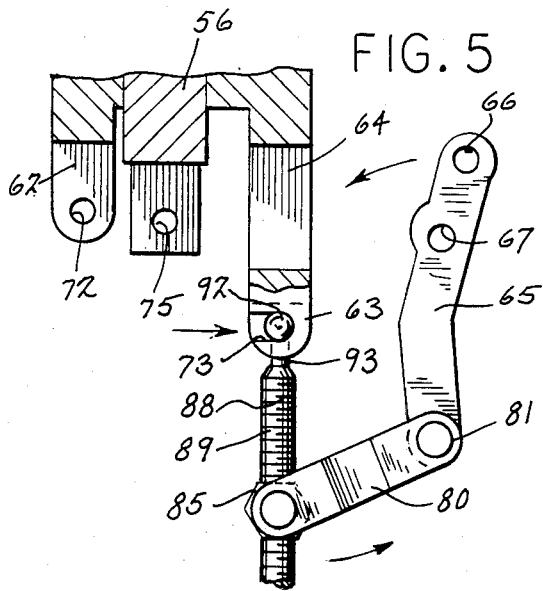
FIG. 5 is an enlarged view, partially in section, illustrating a step in the assembly of the adjustment linkage.

The valve housing is provided with four legs 61-64. A lever arm 65 has three holes 66, 67, 68 drilled through it. Legs 61 and 62 have foot holes 71 and 72. As shown in FIGS. 3, 5 and 7, leg 63 has a U-shaped horizontal foot slot formed therein, and leg 74 has a hemispherical foot socket formed on its inner surface. There is also a hole 74 in the lower end of the piston 56.

Screws 76 and 77 have a threaded end, an unthreaded central post section, and a wide turning end. Screw 76 fits through bores 71 and 66 and then screws into threaded bore 72. The arm 65 freely pivots on the central post section of the screw between legs 61 and 62. Thus, the post forms the pivot axis.

Screw 77 fits through hole 67 and threads into threaded hole 75. The piston 56 is driven by the pivoting of the lever arm 65. This in turn controls the valve. To prevent binding, the central post section 79 (see FIG. 3) of screw 77 is made somewhat narrower in diameter than the diameter of hole 67. This "slop" prevents binding. Other loose means of linkage could also be used at this connection point, such as running the lever arm 55 through a slot in the piston 56.

Figure 8:
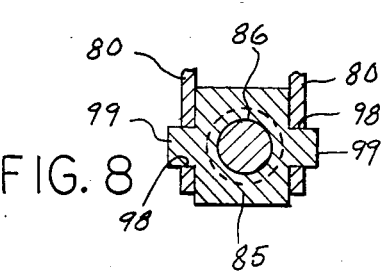
FIG. 8 is a sectional view taken on line 8—8 of FIG. 4.

A connecting link 80 is provided which has aligned upper holes 81 on its two similar arms. The lever arm 65 can be connected to the connecting link 80 using a similar screw mechanism (not shown) or using a rivet 82. It will be appreciated that the lever arm and connecting link pivot with respect to each other along the axis of the rivet 82. The other end of the connecting link 80 is pivotably provided with a nut 85 having a central threaded through bore 86 (see FIG. 8).

Float 87 is provided with extension rod 86. The float rod is threaded along its periphery as shown at 89. Its threads mesh with the internal threads of lock nut 90 and nut 85. At the end of the rod 88 farthest away from the float 87 there is provided a ball 92 and a narrowed portion 93. The lower end of the legs 63, 64 form a socket for the ball. The U-shaped slot 73 provides access for assembly.

Figure 6:
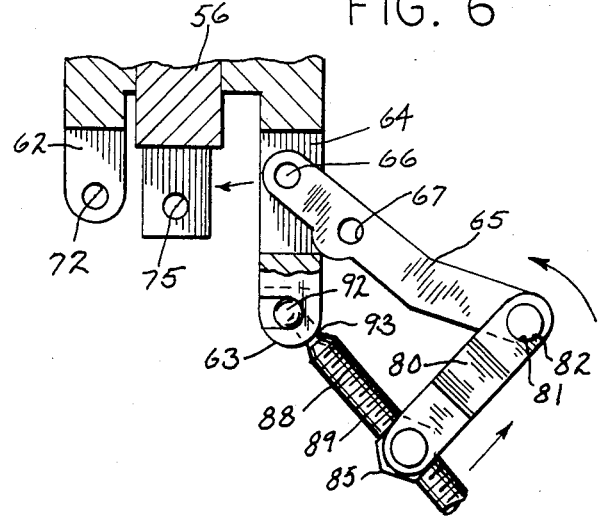
FIG. 6 is a view similar to FIG. 5, with the adjustment linkage further assembled.

FIGS. 5 and 6 detail the assembly of these parts. Rod 88 is positioned vertically as shown in FIG. 3, and has its ball 92 pushed horizontally between the U-shaped slot 73 on leg 63 and the inner side of leg 64, starting at the open end of the U. Because the ball 92 is slightly larger than this space, this causes the legs 63, 64 to flex slightly apart when the ball 92 is not yet in socket 74. The ball 92 then moves into the socket and the legs unflex and trap the ball. The rod 88 is then pivoted to the FIG. 6 position. Note that narrowed portion 93 on the rod 88 easily fits between legs 63 and 64, and the wider main part of the rod and the ball 92 are too thick to pass between the legs when the rod is in this position. The lever arm 65 is then pushed between the legs 61–64 and proximate piston 56. The screws 76 and 77 are then attached.

To adjust the full level of the water in the tank, one merely rotates rod 88. This shifts the nut 85 on the rod and pivots the connecting link 80 with respect to the lever arm 65. Compare the full line and dotted line depictions in FIG. 4. If desired, one can lock the nut 85 in a position on the rod 88 by tightening nut 90 against nut 85.

Note especially that the ball and socket joint 92, 74, 73 forms a universal joint. This unique structure permits both rotation and pivoting of the rod.

To install nut 85 between the sides of connection link 80 (see FIG. 8), one bends the flexible metal sides of the link out to expose their holes 98. Projections 99 on nut 85 can then be inserted in the holes 98, and the metal can then be rebent so that the sides of link 80 press against the nut 85 to trap it.

Preferably, metal is used for the rod 88, nuts 85 and 90, lever arm 65, valve housing 27, and connecting link.

I claim:

1. In a toilet tank float valve assembly of the type having:
   (a) a valve housing with an inlet and an outlet and a valve bore between the inlet and the outlet;
   (b) a piston valve member positioned to reciprocate in the valve bore to control the fluid flow from said inlet to said outlet through the valve housing;
   (c) a lever arm;
   (d) a connecting link;
   (e) said lever arm being linked to the valve housing so as to pivot with respect thereto on a first axis;
   (f) said pivoting of said lever arm causing the piston valve member to reciprocate in the valve bore;
   (g) said lever arm also being linked to the connecting link;
   (h) a float having a rod-like member extending therefrom;
   (i) means connecting the rod-like member to a support for pivotal movement with respect to the valve housing; and
   (j) means for attaching the connecting link to the rod-like member such that the connecting link may be adjustably connected to the rod-like member at a plurality of locations along the rod-like member;

the improvement comprising:
   the rod-like member and the connecting link being fashioned and connected to each other such that rotation of the rod-like member causes the connecting link to automatically move from one connection position along the rod-like member to any other connection position such that the effective length of the connecting link and the lever arm is different from the one connection position to the other connection positions, whereby the level of water required in the toilet tank to close the piston valve member can be adjusted by rotating the rod-like member.

2. The assembly of claim 1, wherein the rod-like member has threads on its periphery, the connecting link has a threaded through bore, and the rod-like member extends into the threaded through bore so that its threads mesh with those of the through bore, whereby rotation of the rod-like member threads drives the through bore threads along the rod-like member.

3. The assembly of claim 2, wherein the rod-like member is connected to the valve housing by a universal joint.

4. The assembly of claim 3, wherein the rod-like member is formed with a ball-like end and the valve housing has a U-shaped slot for providing access to a socket.

5. A toilet tank float valve assembly, comprising:
   a valve housing for controlling the admission of water from a water supply conduit to the toilet tank, said valve housing having an inlet and an outlet;
   movable means for providing communication between said inlet and outlet in an open position and sealing off communication between said inlet and outlet in a closed position;
   a float responsive to the tank water level, said float having a rod-like member extending therefrom, said rod-like member being threaded;
   a nut threadably engaged with said rod-like member;
   a linkage connected to the nut and to the movable means for moving said movable means between the open and closed positions in response to movement of the float; and
   a joint for mounting the rod-like member to a support with the rod-like member being rotatable about its own axis and pivotable about a rod pivot axis which is different from its own axis;
   wherein the tank water level can be varied by adjustably rotating the rod-like member on its own axis to expand or contract the effective length of the linkage.

6. A toilet tank valve assembly as in claim 5, wherein the joint is a universal joint and comprises:
   a ball-head defined by the end of the rod-like member; and
   a valve housing support surface which mates with the ball-head to hold the ball-head in position relative to the valve housing while allowing it to pivot about the rod pivot axis and be rotated about the axis of the rod-like member.

* * * * *